3,737,404
PIGMENT COMPOSITIONS CONTAINING RUTILE TITANIA AND PARTICULATE UREA-FORMALDEHYDE RESIN

Gregor Berstein, Newton Center, Mass., assignor to Cabot Corporation, Boston, Mass.
No Drawing. Filed May 4, 1970, Ser. No. 34,529
Int. Cl. C08g 51/04
U.S. Cl. 260—39 R        5 Claims

ABSTRACT OF THE DISCLOSURE

Improved aqueous emulsion type paints and pigment bases therefor are described in which the principal opacifying pigment is a rutile titania pigment and there is also incorporated therewith per 100 parts of said rutile titania pigment between about 2 and about 20 parts by weight of a substantially water-insoluble, high molecular weight, cross-linked urea-formaldehyde resin in highly dispersed particulate form. Said particulate urea-formaldehyde resin is characterized by a BET specific surface area of between about 15 and about 100 square meters per gram and preferably has a volatile content of not over about 15% by weight.

---

This invention relates to water-based, emulsion type paints with excellent hiding power, as well as specially formulated pigment bases for same, wherein the principal component in terms of contribution to hiding power is rutile type titanium dioxide.

The popularity of water-base, latex paints continues to increase due to their ease of application and short time required for drying after application. Furthermore, the modern emphasis on convenience and speed has spurred the development of highly pigmented latex paints offering the possibility of one coat coverage on the majority of surfaces. In formulating such paints, it has generally proved necessary to employ high-quality pigment bases the primary component of which is rutile titanium dioxide. Although its high refractive index and good stability in most paint systems have made rutile $TiO_2$ pre-eminent as an opacity grade pigment, its sensitivity to flocculation under certain conditions in aqueous media has presented some special problems in latex type paints over and above the usual matter of providing pigment dispersions which achieve optimum optical efficiency from the $TiO_2$ employed in the finished paint.

As the result of the above situation, specially treated rutile $TiO_2$ pigments have recently been developed for use in latex paints. Generally, these treatments involve the deposition of an outer layer of hydrous inorganic oxidic material, such as aluminum and/or silicon oxides. Although these oxidic deposits may amount to from about 1 to 20% of the dry weight of the modified $TiO_2$ pigment, they usually account for only about 2 to about 10% of said dry weight. Accordingly, these treated, high-grade rutile pigments should not be confused with coarse, low-quality, extended type $TiO_2$ pigments such as $CaSO_4$—$TiO_2$ composites where the extender material generally accounts for about 30 to 50% by weight of the total dry pigment. Indeed, these newer modified rutile $TiO_2$ pigments (containing hydrous silica and/or alumina coatings and the like) usually cost just as much as the original unmodified rutile pigments whereas the heavily extended, composite pigments are normally much cheaper.

It is accordingly a principal object of this invention to provide an improved auxiliary pigment for use with rutile $TiO_2$ pigments in latex paints.

It is a further object to provide an auxiliary pigment for use with rutile $TiO_2$ which improves the optical efficiency of the rutile $TiO_2$ without upsetting the balance of aqueous systems such as latex paints.

Another object is to provide highly efficient and improved formulated pigment bases the principal component of which is rutile $TiO_2$ which bases are stable and convenient to use.

Still another object is to provide superior latex paints at reasonable cost.

Other objects and advantages will become apparent from the detailed description of this invention which follows.

In accordance with the present invention, the optical efficiency and performance of rutile $TiO_2$ pigments in latex paints has been surprisingly improved by using as an auxiliary pigment therewith certain high molecular weight, water-insoluble, highly particulate urea-formaldehyde resins. These resins are essentially non-porous and infusible as a result of their highly cross-linked urea-formaldehyde condensation product structure. Preferably, they are characterized by a BET specific surface area of between about 15 and about 100 square meters per grams. These organic auxiliary pigments are effective in very minor proportions especially on a weight basis. Of course, their low specific gravity of about 1.39 to about 1.45 is most favorable, especially in comparison with that of almost any of the inorganic auxiliary pigments. Furthermore, in spite of their relatively low refractive index (generally around 1.6 in air), these cross-linked organic resin powders are light colored and possess very high brightness. Most importantly, the use of as little as about 2 parts by weight of such resin powder per 100 parts of the rutile $TiO_2$ pigment has been found to provide a significant improvement in optical performance of said $TiO_2$ pigment in latex paints of primary interest. In addition, the stability of the finished paint and the integrity of the finished paint film are not diminished by the amounts of said organic resin powder needed to optimize the optical performance of the main rutile $TiO_2$ pigment as shown by such properties as the color uniformity and stain resistance of the finished films.

Although the cross-linked organic resin powders of this invention can be used with some advantage in almost any latex paint, the most meaningful increases in optical efficiency of the primary rutile $TiO_2$ pigment result when they are incorporated in latex paints in which the total Pigment Volume Concentration (i.e. % of solid pigment by volume in final paint film) is above about 25%. However, since the latex paints of greatest commercial importance are usually formulated at Pigment Volume Concentrations of from about 30 to about 70%, the practical value and utility of the present invention is widely assured. Likewise, all of the various chemical types of latex paints are suitable for use in the present invention. Thus, the usable latices include such widely diverse types as polyvinyl acetates, vinyl chlorides, vinylidene chlorides and their copolymers; also acrylic polymers and copolymers, styrene-butadiene and/or butadiene-acrylonitrile copolymers, etcetera.

Furthermore, any of the other conventional ingredients of latex paints can also be included in accordance with the present invention (including such widely varying materials as wetting agents, dispersing or suspending agents, emulsifying agents, viscosity control agents, plasticizers, oil, organic solvents, preservatives, defoamers, hardeners, dryers and coarse and/or fine inorganic extender pigments, etcetera) provided only that opacity grade rutile $TiO_2$ constitutes the primary pigment component and the proper proportion of the cross-linked organic resin powder is included therewith as spelled out with greater particularity hereinafter. Furthermore, as already indicated above, any opacity grade rutile $TiO_2$ pigment (whether specially aftertreated or not) can be used provided it analyzes at least about 80% by weight of $TiO_2$.

Turning now to the unusual, organic, auxiliary pigments used in the present invention, a more detailed description of the chemical and physical nature of these essentially nonporous and infusible, finely divided, urea-formaldehyde resin powders together with preferred methods of preparing same follows.

The molar ratio of urea to formaldehyde chemically combined in the structure of these resins will generally lie between about 1:1 and about 1:2 and preferably between about 1:1.3 and about 1:1.8. Additionally, the internal structure of these resins is highly cross-linked, rendering them essentially infusible and insoluble in water and thus quite different from ordinary fusible and/or water soluble urea-formaldehyde condensation polymers. Although the cross-linked resins of this invention have been washed with water in order to remove water soluble salts or other by-products, they do normally contain a minor amount of volatile matter. (i.e. matter susceptible of removal by subjecting the solid particles of resin to a temperature of about 135° C. for two hours in a vacuum drying oven maintained at a pressure of under 1 mm. of mercury). Except for a percent or so of moisture, this volatile matter consists largely of low molecular weight organic molecules such as formaldehyde. This volatile matter is of no real moment in the present invention as long as it does not exceed about 15% of the weight of the resinous auxiliary pigment particles. However, resin particles containing less than about 10% by weight of volatile matter are preferred from the standpoint of maximum optical efficiency and best performance. As previously mentioned, these resin particles should have a BET specific surface area within the range of about 15 to about 100 square meters per gram, and preferably between about 30 and about 75 square meters per gram.

The urea-formaldehyde polymeric products of the present invention are readily prepared by reacting formaldehyde with urea in suitable proportions in aqueous solution under proper conditions. As previously indicated the molar proportions of formaldehyde to urea should always be between about 1:1 and 2:1 and preferably between about 1.3:1 and 1.8:1. In addition, the amount of water in the reaction solution should never be substantially less than the total weight of the organic reactants therein and, during the actual formation and precipitation of the highly cross-linked, insoluble resin particles, should always be in substantial excess of the total weight of all of the other components of the reaction mixture.

Suitable reaction temperatures are generally in the range from about normal room temperature up to about 100° C., with the range from about 40° C. up to about 85° C. usually being most practical. Stirring or other intermixing activity in the aqueous reaction medium is advisable, especially during the later stages of reaction when the insoluble, high molecular weight, cross-linked resin particles are being formed.

One of the most important conditions inherent in successfully preparing infusible and insoluble, particulate urea-formaldehyde resins of the quality required to serve as the auxiliary pigment of the present invention is the use of a suitable cross-linking catalyst during the resin forming reaction. As is known in the art, the best catalysts for this purpose are relatively strong inorganic and/or organic acids such as sulfuric, phosphoric, sulfamic, or chloroacetic acids, etcetera. In general, this acid curing or cross-linking catalyst should have an ionization constant greater than about $10^{-4}$. However, the most preferred catalysts for making products as described herein are sulfamic acid and/or water-soluble ammonium acid sulfate salts, such as ordinary ammonium bisulfate and certain organic derivatives of same wherein a simple, essentially hydrocarbon type radical, such as a methyl group, replaces one of the hydrogen atoms in said "ammonium" structure. Further details of such catalysts as well as suitable methods for preparing cross-linked urea-formaldehyde powders are described in copending application U.S. Ser. No. 2,427 filed on Jan. 12, 1970.

Although the above-described acid catalysts can be present in the reaction medium from the beginning, it is preferred to conduct the urea-formaldehyde resin formation reaction in two stages. In the first stage the urea and formaldehyde are allowed to react normally in accordance with the conventional condensation mechanism, forming a low molecular weight, water-soluble precondensate and then in a second stage the acid curing catalyst is introduced to promote faster reaction and cross-linking with formation of the insoluble, particulate solid. Conveniently, the intensity of mixing in the reaction medium is increased sharply when the catalyst is introduced in order to minimize continuous gel formation and promote the formation of more highly dispersed particulate solid aggregates.

Regardless of whether the catalyst is present throughout the reaction or admitted only in the latter stage thereof, the final insoluble resin solid will ultimately be recovered from the aqueous liquid by conventional techniques including one or more of such operations as filtration, centrifugation, and drying. Various drying techniques can be employed, such as spray drying, forced air drying, azeotropic distillation, convection drying, etcetera. Although basically of finely particulate character, the final solid will naturally be more or less agglomerated into secondary aggregates or gel-like granules. Therefore, it will usually be desirable to subject same to some form of continuing or deagglomerating action in order to realize its full potential as an auxiliary pigment powder in the present invention. For this purpose the final resinous reaction product can be subjected to various disintegrating or impact-type milling operations including such things as ball milling, pin milling, high fluid energy jet milling or high speed rotary disc mills, etcetera.

In an optional but strongly preferred embodiment of the present invention, water-soluble macromolecular organic substances which tend to increase the viscosity of aqueous solution, referred to hereinafter as protective colloids, are added to the reaction mass either before or after the formation of the water-soluble urea-formaldehyde precondensate. Typical examples of such protective colloids are natural substances such as starch, gelatin, glue, tragacanth, agaragar and gum arabic; modified natural substances such as carboxymethyl cellulose, the alkali metal salts of carboxymethylcellulose, particularly the sodium salt of carboxymethylcellulose, methylcellulose, ethylcellulose, betahydroxyethylcellulose, alkali metal alginates and the like, synthetic polymers such as polyvinyl alcohol, polyvinyl pyrrolidone, water-soluble polymers and copolymers of acrylic or methacrylic acids and alkali metal salts thereof, salts of maleic acid-containing copolymers, styrene-maleic anhydride copolymers, polyhydrochlorides of homopolymers and copolymers of vinylpyridine and the like. The amounts of protective colloids to be employed are dependent on the type, chemical structure and molecular weight thereof. However, the protective colloids are generally used in amounts ranging from about 0.1 to about 5 percent by weight based on the weight of the urea and formaldehyde reactants in order to promote more finely divided, highly particulate end products. Preferably, amounts of the protective colloid ranging from about 0.5 to about 3 percent by weight based on the weight of the urea and formaldehyde reactants are used. In practice, the protective colloid may be added, in the case of the single-stage process for preparing the urea-formaldehyde polymers, at any stage of the wet end of the manufacturing process preceding the actual formation of cross-linked, infusible and insoluble particles. Alternatively, with similarly advantageous results, the protective colloid may be added before or after the formation of the urea-formaldehyde precondensate in a two-stage process for preparing the insoluble, infusible urea-formaldehyde polymers.

The optimum procedure for preparing the urea-formaldehyde auxiliary pigments of this invention entails the use of sulfamic acid or a water-soluble ammonium hydrogen sulfate as hereinabove defined as a curing catalyst in combination with a protective colloid in the conversion of a precondensate of urea and formaldehyde into the cross-linked gel. In more detail, a precondensate of urea and formaldehyde having a molar ratio of from about 1:1 to about 1:2 of urea to formaldehyde is formed at a temperature varying from room temperature to about 100° C. and at a pH range of from about 6 to about 9 and for a period of time sufficient to permit the greater portion of the formaldehyde to be reacted with the urea. A protective colloid, such as the sodium salt of carboxymethylcellulose, is added to the precondensate at any time during the production thereof, or is added separately as a solution to an initially prepared precondensate. To the resultant precondensate there is then added, with agitation, a solution of sulfamic acid or a water-soluble ammonium hydrogen sulfate at a temperature ranging from room temperature to about 100° C. until a cross-linked gel is formed. The gel is subsequently comminuted in an extruder or a cutter-granulator and the precipitate is separated by filtration or centrifugation. The resultant reaction product, which is a solid, infusible and insoluble urea-formaldehyde polymeric condensation product, is neutralized and dried by any conventional technique such as air drying and is then deagglomerated by means of a pin mill, an air jet mill, a ball mill or other impact mill. The progress and effectiveness of such deagglomeration treatments can readily be seen by measuring the pour density of the resinous powder before and after it passes through the milling device employed. Generally, reductions in pour density of at least about 0.01 gms./cc. are achieved in such treatments and in many cases several times as much, depending upon the degree of agglomeration in the final reaction product and the intensity of treatment. For easiest incorporation and best performance in the formulated products of this invention, a final pour density of not substantially over about 0.1 gms. per cc. is preferred in the resinous auxiliary pigment powder actually used.

As previously indicated hereinabove the principal component of the pigment bases and the principal pigment component of the latex paints of this invention will always be a rutile type titanium dioxide pigment containing at least about 80% by weight of $TiO_2$. The particulate resinous auxiliary pigment will then be included as a minor component in sufficient proportion to the total weight of said rutile titanium dioxide pigment to effect a significant improvement in the optical efficiency thereof. For most combinations of such rutile pigments with the cross-linked urea-formaldehyde resin auxiliary pigments of the character described herein, significant improvements in said optical efficiensy can be detected at loadings of said resinous auxiliary pigment as low as about 2 parts by weight per 100 parts of the rutile pigment. Considering the optimization of both optical efficiency and the overall balance of properties of the finished paint, the range of loadings of primary interest will usually run from about 2 to about 20 parts, and preferably from about 3 to about 12 parts, by weight of the particulate organic auxiliary pigment per 100 parts of the rutile pigment.

In practicing the present invention, the finished paint formulation can be manufactured by either adding the opacity grade rutile pigment and the resinous auxiliary pigment separately to the mill paste during the normal mixing operations or by preblending these two particulate solids to make a formulated pigment base which can then be introduced to the paint batch during the mixing stages thereof. Some of the coarse extender pigments conventionally included in latex paints (such as clays and/or calcium carbonates) may also be present in such a preblended dry pigment base if such is desired, but the preferred pigment base compositions will consist essentially of the rutile pigment and the resinous auxiliary pigment.

Instead of merely dry blending the rutile pigment and the cross-linked resin powder to prepare the above-described preformulated pigment bases, it is often more convenient and economical to mix the final aqueous slurry of urea-formaldehyde resin resulting at the end of the cross-linking reaction with an aqueous slurry of the rutile pigment and then conducting the usual finishing operations normally employed to recover solid products from aqueous liquors, such as filtration, drying, etcetera. Furthermore, regardless of whether the two solid pigment components are dry blended or wet blended, it is often especially advantageous to subject the blended pigments to at least one pass through an impact milling device, such as a pin mill or a fluid energy jet mill, with the latter type being preferred.

In order to provide a fuller understanding of the present invention and preferred practical embodiments thereof, the following non-limiting, illustrative working examples are given.

EXAMPLE A

Preferred procedure for preparing cross-linked urea-formaldehyde resin powder

To serve as a protective colloid, 3.15 grams of the sodium salt of a high molecular weight carboxy-methylcellulose was dissolved in 157.5 grams of de-ionized water in a glass reaction vessel equipped with temperature control means and a variable speed agitator. Then, 225 grams of an aqueous formaldehyde solution containing 30% formaldehyde by weight are introduced, and the contents of the vessel are heated to about 70° C. After adjusting the pH of the resulting solution to about 7.0 by adding a little dilute caustic soda solution, 90 grams of urea were added while stirring to dissolve same. Mild agitation is continued for 3 hours while maintaining the temperature of the vessel at about 70° C.

Next, the temperature of the vessel and contents is reduced to about 50° C. Then, a solution of 4.85 grams of sulfamic acid in 157.5 grams of water, also at 50° C., is added rapidly with vigorous, high-speed stirring. A moderately exothermic reaction ensues which rapidly raises the temperature of the reaction vessel contents to about 65° C. with the simultaneous formation of a voluminous precipitate of insoluble resin solids throughout the reaction mixture. The resultant gel-like matrix is allowed to cure for about 3 hours while holding the temperature at about 65° C. and is then comminuted to granular agglomerates of about 1 to 2 millimeters maximum size.

The granulated product is then dispersed into about 500 cc. of water by stirring and the pH of the resultant slurry adjusted to about 7.5 with dilute sodium carbonate solution. The slurry is then filtered and the solid filter cake is washed with fresh water and dried in a current of hot air (about 110° C.). After cooling to about room temperature, the dry solid product is deagglomerated by passing same through a high-speed pin mill followed by a fluid energy jet mill operating with superheated steam fed at about 70 p.s.i.g. and 232° C. From the milling operations, there is collected a total of 117 grams of fine, bright, infusible resin powder having a BET specific surface area of about 53 square meters per gram, a true specific gravity of about 1.4, pour density of about 60 grams per liter and a volatile content of about 8% by weight (determined by heating a sample for 2 hours at 135° C. and 0.01 millimeter of Hg).

EXAMPLE 1

This example illustrates the use of cross-linked urea-formaldehyde resin powders as auxiliary pigments in a latex paint formulated at a relatively low Pigment Volume Concentration of 30%, i.e. considerably below the critical Pigment Volume Concentration.

Two batches of paint were made according to the following formulations:

| Ingredients | Amounts in batch (parts by weight) | |
|---|---|---|
| | Control | Experimental |
| Water | 156.7 | 156.7 |
| Potassium tripolyphosphate | 0.7 | 0.7 |
| Tamol 731 [1] | 4.6 | 4.6 |
| Ethylene glycol | 17.5 | 17.5 |
| Lecithin (water-dispersible) | 4.0 | 4.0 |
| Polyethylene glycol (Dow P-1200) | 3.0 | 3.0 |
| Carbitol solvent | 15.0 | 15.0 |
| 2% Cellosize solvent in H₂O | 165.0 | 165.0 |
| Polyvinylacetate latex (55% solids content in H²O) | 457.0 | 457.0 |
| Phenyl mercuric acetate (preservative) | 0.5 | 0.5 |
| Troykyd defoamer 333 | 3.0 | 3.0 |
| Titanox RA-47 pigment [2] | 191.2 | 191.2 |
| "ASP-400" clay pigment | 56.8 | 45.3 |
| "Snowflake White" calcium carbonate | 56.8 | 45.3 |
| Urea-formaldehyde powder of Example A | | 12.9 |

[1] Tamol 731 is the trade name of Rohm and Haas Company for an anionic dispersant which is a 25% solution of the sodium salt of a polymeric carboxylic acid.

[2] Titanox RA-47 is the trade name of Titanium Pigments Corporation for a rutile type titania pigment recommended for use in emulsion paints and analyzing about 90% $TiO_2$ by weight.

Half of each of the above batches of white paint were removed and tinted to a medium gray shade by adding to each the same small quantity of a standard predispersed lamp black tinting color. Drawdowns of each white paint were then made over a black background at a wet film thickness of 12 mils (i.e. sufficient to completely obscure the black background). Likewise, standard drawdowns of a wet film thickness of 2 mils were made from each white paint and from each gray paint over white backgrounds, providing complete hiding by the gray films.

A Model D-1 Color-Eye Instrument manufactured by Instrument Development Laboratories, Incorporated of Attleboro, Mass. was employed to measure reflectances of the dried paint films using Illuminant C and the "Y" green filter with the readings based upon calibrated Vitrolite panels being expressed in percentages (relative to magnesium oxide as 100%).

The following test results represent the average of several readings from multiple drawdowns on each paint.

| Parameter checked | Test paints | |
|---|---|---|
| | Control | Experimental |
| Reflectance of 12 mil white film (R ∞ white) | 92.6 | 93.3 |
| Reflectance of 2 mil gray film (R gray) | 42.2 | 44.1 |

Using calculation methods based upon the Kubelka-Munk equation as described in references such as the book by Judd and Wyszecky entitled "Color in Business, Science and Industry," 2nd Edition, published in 1963 by John Wiley and Sons (see especially pages 389 through 399), the above reflectance values can be used to find the ratio of the scattering coefficient to the absorption coefficient (S/K) for each gray paint. In the present example, these ratios are as follows:

$$(S/K)_{control} = 2.53; \quad (S/K)_{experimental} = 2.82$$

Since the absorption coefficient, K, in each of said films is attributable only to the black tinting pigment contained therein, which is exactly the same in both, the scattering coefficient of the experimental paint is obviously more than 11% higher than that of the control paint, representing a most significant improvement in hiding power from introducing only about 7% of the cross-linked urea-formaldehyde resin powder based upon the weight of the opacity grade titania pigment used. Furthermore, a staining test run on the 2 mil drawdowns of the white paints using an aqueous Nigrosine solution as the staining medium showed that there was no difference in soil resistance of the two formulations.

EXAMPLES 2 AND 3

Similar comparisons to those in Example 1 were made using two different commercial rutile titania pigments, one having a $TiO_2$ content of about 82% and the other about 98% by weight. However, in both of these examples the total loading of pigment solids in the paints was increased to give a PVC of 59%, which is above the critical PVC.

All of these paint batches were mixed to the following generalized formulation.

| Ingredients: | Amounts in parts by weight |
|---|---|
| Potassium tripolyphosphate | 0.5 |
| Tamol 731 | 7.0 |
| Water | 219.0 |
| Ethylene glycol | 15.0 |
| Lecithin (water-dispersible) | 4.0 |
| Polyethylene glycol (Dow P-1200) | 3.0 |
| Carbitol solvent | 15.0 |
| 2% Cellosize solution in H₂O | 210.0 |
| Polyvinylacetate latex (55% solids content in H₂O) | 229.0 |
| Phenyl mercuric acetate | 0.3 |
| Troykyd defoamer 333 | 3.0 |

Solid pigments (see below), to give PVC of 59%.

The solid pigment combinations used in these examples were as follows:

| | Amounts in parts by weight | | | |
|---|---|---|---|---|
| | Example 2 | | Example 3 | |
| Solid component | Control | Exp.* | Control | Exp. |
| Rutile pigment (82% $TiO_2$) | 213.8 | 213.8 | | |
| Rutile pigment (98% $TiO_2$) | | | 225 | 191.7 |
| "ASP-400" clay | 126.2 | 120.0 | 132.5 | 121.7 |
| "Snowflake" $CaCO_3$ | 126.2 | 120.0 | 132.5 | 121.7 |
| Urea-formaldehyde powder of Example A | | 6.8 | | 23.3 |

*Exp. means "Experimental."

The finished paints were tested as is and after being tinted medium gray exactly as outlined in Example 1. The test results were as follows:

| | Example 2 | | Example 3 | |
|---|---|---|---|---|
| Parameter checked | Control | Exp. | Control | Exp. |
| R∞ white | 94.2 | 94.6 | 91.0 | 91.7 |
| R gray | 51.8 | 52.7 | 42.1 | 43.3 |
| S/K (calculated) | 4.46 | 4.71 | 2.52 | 2.69 |
| Staining resistance | All substantially the same | | | |

*Exp. means "Experimental."

Thus, it is seen that small additions of cross-linked urea-formaldehyde resin powder have achieved significant increases in scattering coefficient, S (or relative hiding power) in both of these high PVC systems. Furthermore, at least as good results are achieved in the above examples when the titania pigment and the urea-formaldehyde resin powder are preblended before incorporation into the paint batches.

Except for the titania and the urea-formaldehyde resin powders, the ingredients of the above paint systems are not critical and many substitutions can be made therein as already indicated and as is well known in the art of formulating latex paints.

What is claimed is:

1. A pigment composition with high hiding capacity comprising as the principal pigment component rutile titania pigment suitable for use in aqueous emulsion-type paints and also containing per 100 parts by weight of said rutile titania pigment between about 2 and about 20 parts of an essentially water-insoluble and infusible, cross-linked urea-formaldehyde resin in highly dispersed, free and independent particle form having a surface area of between about 15 and about 100 square meters per gram, said free and independent particle form of said resin being due to its having been separately formed and cross-linked to said essentially water-insoluble and infusible state before being mixed with said rutile titania pigment.

2. A pigment composition as in claim 1 wherein said urea-formaldehyde resin has a specific surface area of over 30 square meters per gram, a pour density of not over 0.1 grams per cc and a volatile content of not over about 15% by weight.

3. A pigment composition as in claim 1 containing per 100 parts of said rutile titania pigment between about 3 and about 12 parts by weight of said urea-formaldehyde resin.

4. A pigment composition as in claim 1 wherein said principal pigment component contains at least about 80% by weight of $TiO_2$ with the balance being mostly hydrous inorganic oxidic material.

5. A pigment composition as in claim 1 wherein said particulate urea-formaldehyde resin has a chemical constitution characterized by a formaldehyde to urea molar ratio of between about 1.3:1.0 and about 1.8:1.0.

References Cited

UNITED STATES PATENTS

| | | | |
|---|---|---|---|
| 2,119,189 | 5/1938 | Widmer | 260—39 P X |
| 2,461,538 | 2/1949 | Fischer | 260—39 R X |
| 3,427,278 | 2/1969 | Suita | 260—39 R X |

MORRIS LIEBMAN, Primary Examiner

S. PERSON, Assistant Examiner

U.S. Cl. X.R.

106—300